Patented Jan. 8, 1935

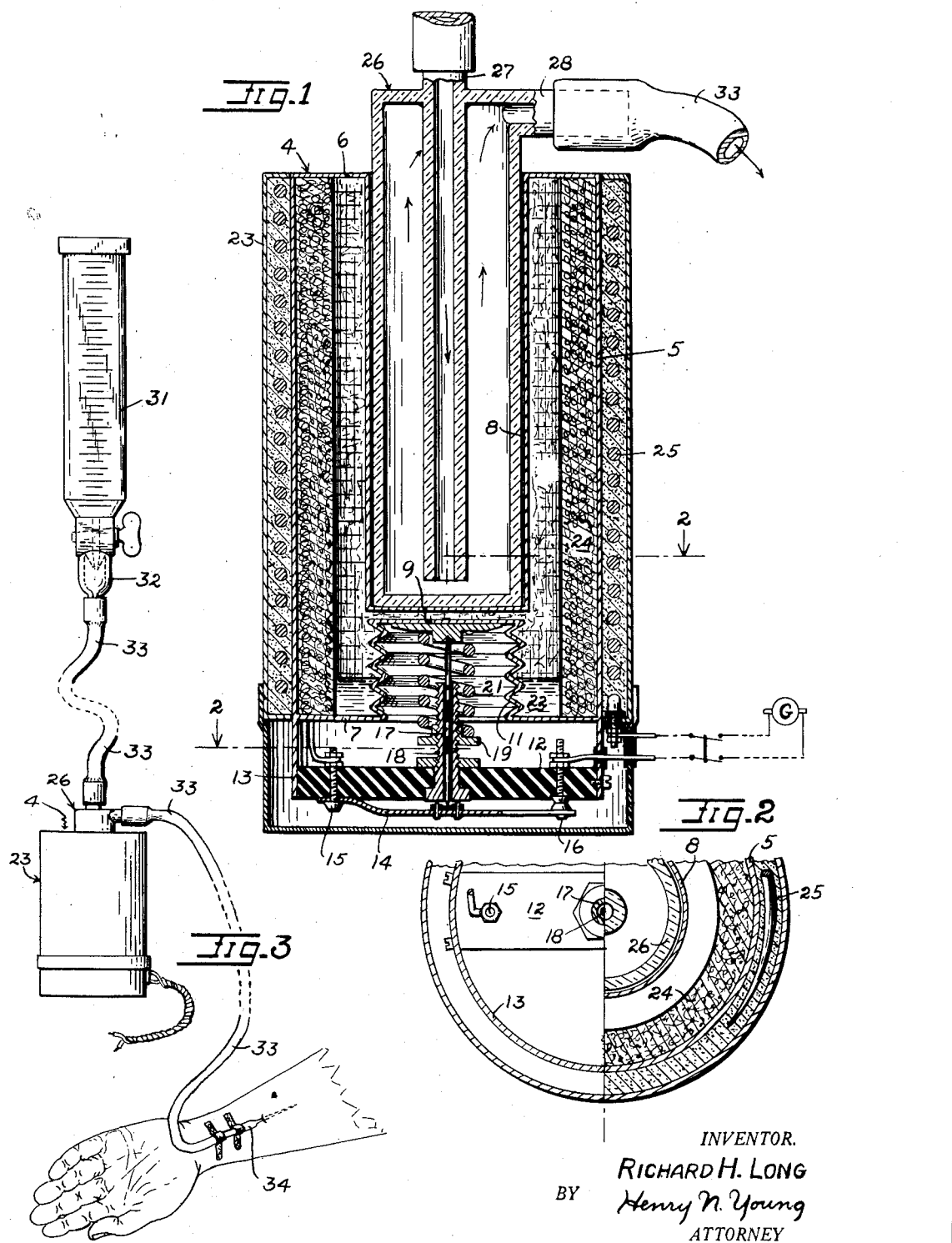

1,987,119

UNITED STATES PATENT OFFICE 1,987,119

HEATER FOR FLUIDS

Richard H. Long, Alameda, Calif.

Application June 20, 1932, Serial No. 618,097

10 Claims. (Cl. 219—39)

The invention relates to a heat transferring device and more particularly to a continuously operating fluid heater.

A general object of the invention is to provide a heater of the class described wherein the temperature of the heated fluid is arranged to be automatically held constant even though the flow rate of said fluid may vary through a considerable range.

A more specific object is to provide an improved heater wherein the vapor of a liquid is utilized as a heat transferring medium.

A further object of the invention is to provide a heater unit of the character described wherein a constant charge of the heat transferring medium is used, said fluid charge enclosed in a sealed container.

Yet another object of the present invention is to directly utilize the vapor pressure of the heat transfer fluid in the said vessel thereof for effecting the aforesaid control of the temperature of the heated fluid.

An added object is to provide means for insuring maximum and independent thermal exposures of the liquefied heat transferring medium to the source of heat and solely vaporized said medium to the fluid to be heated.

A still further object is to provide a heating unit of the character described which is portable and is particularly valuable in medical and surgical practice where liquid injections are to be made at predetermined and constant temperatures for the injected liquids.

The invention possesses other objects and features of advantage, some of which, with the foregoing, will be set forth or be apparent in the following description of a typical embodiment of the invention which is illustrated in the accompanying drawing, in which, Figure 1 is a central sectional view through a heater embodying the present invention.

Figure 2 is a stepped section on the line 2—2 in Figure 3.

Figure 3 is a somewhat diagrammatic view which discloses the heater in use for controlling the temperature of a fluid which is being applied intravenously.

Essentially, the present heater comprises a sealed container having therein a vaporizable liquid which is arranged to operate as a heat transfer medium between different wall portions of the container through its evaporation and condensation at the different wall portions, the latter being thermally exposed to the heat-emitting and heat-absorbing elements or substances between which a heat transfer is to be effected. For producing a unit which is compact and rapid in operation, it is desirable that the areas of the container wall portions at which heat transfers are to occur be as large as possible while permitting the desired functioning of the heater, and the disclosed structure has been designed to this end.

As particularly illustrated, a container 4 is provided having a cylindrical side wall 5 and end walls 6 and 7 cooperative with the wall 5 to provide a closed space. Centrally thereof the end wall 6 is shown as formed to provide a cylindrical cup 8 extending into the space defined within the tubular side wall 5. The wall 7 is formed with a transversely offset portion 9 connected to the remainder of this wall by bellows or accordion connection 11 whereby the wall portion 9 is displaceable in accordance with the pressure conditions obtaining at the opposite sides thereof. Preferably and as shown, the movable wall portion 9 is normally disposed close enough to the inner end of the cup 8 so that the latter may serve as a stop to limit the inward movement of the former. At least the wall 5 and the walls of the cup 8 are metallic for heat conducting purposes.

Mounted on the container 4 opposite and outwardly of the end wall 7 thereof is a switch base element 12, said element particularly shown as fixed diametrically across a tubular extension 13 of the side wall 5 and being electrically non-conductive. A spring switch arm 14 is mounted at the outer side of the element 12, said arm extending from a binding post 15 across the axial line of the container and normally engaging a contact provided by a binding post 16 mounted in the base element whereby to electrically connect said binding posts.

A thrust pin 17 is operatively engaged between the movable wall 9 and the switch arm 14 in the axial line of the container whereby a displacement of the former due to an increase of pressure within the container cavity is arranged to displace the latter to open the electric circuit at the contact of the post 16. Preferably, the pin 17 engages suitable thrust plates carried by the movable wall portion 9 and the switch arm 14, the thrust plate for the latter being of non-conductive material. The switch operating pin 17 is slidably engaged in the bore of a sleeve member 18 which is fixed to the base element 12 and extends through said element and toward the movable wall portion 9. Externally thereof, the exposed portion of the member 18 is threaded and carries a spring seat element 19.

A compression spring 21 is engaged between the element 19 and the thrust block of the movable wall 9 whereby to supplement the resistance of the bellows joint 11 to an outward movement of the movable wall. By reason of the fact that the seat member 19 is variably disposable along the sleeve 18, the resistance to an outward movement of the movable wall 9 may be variably adjusted.

The closed cavity defined within the container 4 is arranged to contain a charge of a fluid which is liquid at normal temperatures and pressures, and which boils at a temperature approximating that which is desired for the liquid to be heated. Said fluid is utilized as a heat transferring medium and is denoted in its liquid form by the numeral 22. The liquid 22 contacts the side wall 5 of the container for acquiring heat therefrom to evaporate it, and the vapor of said liquid is arranged for condensation at the walls of the cup 8 by reason of the heating of a fluid in the cup by its heat of vaporization. The container is so designed that the liquefied heat transfer medium will at no time come in contact with the cup 8, whereby the heat transfer is effected solely through the vaporized medium.

An electric heating unit 23 is provided for supplying heat to the liquid 22 at the container wall 5. Preferably and as shown, the inner face of the wall 5 is lined with a wick 24 whereby the liquid 22 may be carried to all parts of the wall. The wick 24 is tubular and is spaced from the cup 8. The heating unit 23 is also tubular and provides a heating conductor 25 extending helically therealong whereby to distribute the heat from the unit for the entire length of the wick 24. The heater 23 is included in an electric power circuit which includes the switch arm 14 whereby the disposal of the movable wall 9 is arranged to control the condition of the switch.

It will now be noted that when the heating unit is energized the liquid 22 will be vaporized from the wick to provide heated vapor in the container and simultaneously build up the pressure therein. If now a fluid flow be maintained in and through the cup 8, the fluid so circulated will acquire heat from the vapor and through the cup walls until its temperature approximates that of the vapor, a certain amount of the vapor being condensed for supplying the necessary heat. As particularly illustrated, a cylindrical glass vessel 26 is disposed in the cup 8, said vessel arranged to receive a fluid for heating through an axial tube 27 extending therein for the length of the vessel and to discharge the heated said fluid from a radial outlet tube 28.

With a fluid passing through the vessel 26 at a given rate and heat being supplied by the heater 23 at a constant rate, an equilibrium temperature will be reached for the fluid in the vessel 26, provided the circuit through the heating unit remains closed. Since it is the temperature of the discharged fluid which is to have a pre-determined value the vapor pressure in the container cavity is arranged to displace the movable wall 9 for opening the heater circuit when the desired fluid temperature is exceeded, it being noted that adjustment for the opening of the switch at the proper time is effected through appropriate adjustment of the spring seat member 19. In this manner, the temperature of the discharged and heated fluid is arranged to be automatically maintained without involving an appreciable temperature change within the liquid 22 and its vapor, and the resulting regulation is particularly close. It is noted that the control afforded is equally effective if the flow rate of the heated fluid changes.

A particular use for which the present embodiment of my invention is designed, is for providing a liquid injection for human application at a constant and unvarying temperature even though the flow rate of administration may vary. As particularly shown in Figure 3, the liquid is supplied by gravity from a reservoir 31 having associated therewith a sight feed 32 which discharges into a flexible hose 33 and through an injector needle 34 for making an intravenous injection of the liquid. The vessel 26 is interposed in the hose 33 whereby the liquid may be delivered to the needle 34 at a desired and pre-determined temperature. In the present instance the desired temperature would be from 98 to 105 degrees Fahrenheit and the liquid would be supplied from the reservoir 31 at 70 or 80 degrees Fahrenheit. In order that the described hating apparatus may function most efficiently for its intended purpose, it will generally be desirable that the boiling temperature of the heat transfer medium used in the container 4 be slightly lower than that of the heated fluid discharged from the vessel 26; to satisfy the present temperature condition, an organic compound such as ethyl ether is found to be particularly satisfactory for use as such medium. It will be understood that mediums of different compositions would be used in the sealed space of the container 4 for different desired discharged temperatures of heated fluid; for instance, if the discharge temperature is to slightly exceed 212 degrees Fahrenheit, the heat transfer medium may be water. It will be understood, however, that a given medium may be used through a fairly wide range of adjusted desirable temperatures for heated fluids, this by reason of the confinement of the charge in the closed container.

It is to be noted that the present apparatus is portable and may be used in the upright position shown or in a reclining position without impairing the efficiency of its operation, the arrangement being such that the liquefied heat transfer medium will in no case contact the wall of its cup portion 8. While the vessel 26 is shown as of glass for sanitary reasons, it will be obvious that the fluid to be heated may be directly circulated in the cup 8 or in a coil which may be provided in lieu of said cup and extend into the space of a sealed container for the heat transfer medium.

In the foregoing description taken in connection with the accompanying drawings, the advantages of the construction and method of operation of the disclosed device will be readily understood by those skilled in the art to which the present invention appertains, and while I have described the principle of operation in connection with a device which illustrates a typical application thereof, I desire to have it understood that the particular application shown is merely intended as illustrative of one of many which are possible and that such changes may be made, when desired, as fall within the scope of the appended claims.

Having thus described my invention, I claim as new and desire to secure by Letters Patent of the United States the following:

1. In apparatus for transferring heat from a heat source to a heat-receiving medium, a sealed container, a liquid charge sealed in said container, and means whereby different wall portions of said container are thermally exposed respectively to said source and medium, said liquid adapted to be vaporized at the first said wall portion and the vapor to be condensed at the second said wall portion whereby the heat of vaporization of the liquid is applied to said medium as the primary heating means therefor.

2. In apparatus for transferring heat from a heat source to a heat-receiving medium, a sealed container having different wall portions thereof formed of heat-conducting material and thermally exposed respectively to said source of heat and to said medium, and a heat-transferring liquid sealed in said container, said liquid adapted to be vaporized at the first said wall portion and to be condensed at the second said wall portion.

3. In means for heating a fluid to a predetermined temperature, a source of heat, a sealed container having different wall portions thereof thermally exposed respectively to said source of heat and to said fluid, and a fluid heat-transferring medium sealed in said container, said medium normally liquid and adapted to be vaporized at the first said wall portion and to be condensed at the second said wall portion and at a temperature approximating the aforesaid predetermined temperature for the heated fluid.

4. In means for heating a fluid to a predetermined temperature, a controllable source of heat, a sealed container having different wall portions thereof thermally exposed respectively to said source of heat and to said fluid, a vaporizable liquid in said container and arranged to be vaporized at the first said wall portion and to be condensed at the second said wall portion, and means for automatic operation by and in accordance with the vapor pressure in said container to control said source of heat for maintaining the temperature of the heated fluid at said predetermined temperature therefor.

5. In means for heating a fluid to a predetermined temperature; a controllable source of heat; a sealed container having different wall portions thereof thermally exposed respectively to said source of heat and to said fluid, and a movable wall portion variably disposable in accordance with the pressure obtaining in the container; a vaporizable liquid in said container and arranged to be vaporized at the first said wall portion and to be condensed at the second said wall portion; and means operable by said movable wall portion to control said source of heat for maintaining the temperature of the heated fluid at said predetermined temperature therefor.

6. In means for heating a stream of fluid to a predetermined temperature thereof, an electric heating unit, switch means controlling the supply of power to said heating unit, a sealed container having different wall portions thermally exposed respectively to said heating unit and to said fluid stream, a vaporizable liquid in said container and arranged to be vaporized at the first said wall portion and to be condensed at the second said wall portion, and means operative in accordance with the vapor pressure in said container to control said source of heat for maintaining the temperature of the heated fluid stream at said predetermined temperature therefor.

7. In a fluid heater, a sealed container, a heating cup extending into the container space and arranged to have a stream of fluid circulated therethrough for heating, a heating means operative at a container wall portion, and a charge of fluid sealed in said container having a liquefied portion thereof thermally exposed to said heating means for evaporation and a vaporized portion thereof at said cup for condensation thereat.

8. In a fluid heater, a closed container of cylindrical outline, a heating cup extending axially into the container space and arranged to have a stream of fluid circulated therethrough for heating, a tubular heating jacket enclosing the container in thermal contact with the cylindric side wall of the container, and a charge of fluid in said container having liquefied and vaporized portions, the liquefied portion of said charge being spaced from said cup when the container is upright or in a prone position.

9. In a fluid heater, a closed container of cylindrical outline, a heating cup extending axially into the container space and arranged to have a stream of fluid circulated therethrough for heating, a tubular heating jacket enclosing the container in thermal contact with the cylindric side wall of the container, a charge of fluid in said container having liquefied and vaporized portions, the liquefied portion of said charge constantly spaced from said cup, and a wick lining the inner face of said container side wall for distributing the said liquefied charge portion along said wall for evaporation by the heat of said heating jacket.

10. In a fluid heater, a closed container, a heating cup extending into the container space and arranged to have a stream of fluid circulated therethrough for heating, a heating jacket enclosing the container in thermal contact with its side wall, and a charge of fluid in said container having liquefied and vaporized portions, the liquefied portion of said charge arranged to be constantly spaced from said cup when the container is upright or in prone position.

RICHARD H. LONG.